United States Patent
Wienand et al.

(10) Patent No.: US 9,829,390 B2
(45) Date of Patent: Nov. 28, 2017

(54) HIGH-TEMPERATURE CHIP WITH HIGH STABILITY

(71) Applicant: Heraeus Sensor Technology GmbH, Hanau (DE)

(72) Inventors: Karlheinz Wienand, Aschaffenburg (DE); Matsvei Zinkevich, Goldbach (DE); Margit Sander, Karlstein (DE)

(73) Assignee: Heraeus Sensor Technology GmbH, Hanau (DE)

(*) Notice: Subject to any disclaimer, the term of this patent is extended or adjusted under 35 U.S.C. 154(b) by 291 days.

(21) Appl. No.: 14/438,064

(22) PCT Filed: Sep. 23, 2013

(86) PCT No.: PCT/EP2013/069696
§ 371 (c)(1),
(2) Date: Apr. 23, 2015

(87) PCT Pub. No.: WO2014/063877
PCT Pub. Date: May 1, 2014

(65) Prior Publication Data
US 2015/0292955 A1 Oct. 15, 2015

(30) Foreign Application Priority Data
Oct. 25, 2012 (DE) .................. 10 2012 110 210

(51) Int. Cl.
*G01K 7/00* (2006.01)
*G01K 7/18* (2006.01)
(Continued)

(52) U.S. Cl.
CPC ........... *G01K 7/18* (2013.01); *F02D 41/1446* (2013.01); *G01K 1/08* (2013.01); *G01K 13/02* (2013.01);
(Continued)

(58) Field of Classification Search
None
See application file for complete search history.

(56) References Cited

U.S. PATENT DOCUMENTS 4,530,884 A * 7/1985 Erickson .................. B32B 7/04
123/193.6
5,332,991 A 7/1994 Kojima et al.
(Continued)

FOREIGN PATENT DOCUMENTS

DE 19742696 A1 5/1999
DE 19934110 A1 2/2001
(Continued)

OTHER PUBLICATIONS

Office Action dated Sep. 2, 2016 in CN Application No. 201380055826.1.
(Continued)

*Primary Examiner* — Erica Lin
(74) *Attorney, Agent, or Firm* — Panitch Schwarze Belisario & Nadel LLP

(57) ABSTRACT

The invention relates to temperature sensors, in particular high-temperature sensors, having an optionally coated substrate, at least one resistor structure, and at least two connection contacts. The connection contacts electrically contact the resistor structure, and the substrate is made of zirconium oxide or a zirconium oxide ceramic stabilized with oxides of a trivalent metal and a pentavalent metal. The substrate is coated with an insulation layer and the resistor structure and the free regions of the insulation layer, on which no resistor structure is disposed, are at least partially coated with a ceramic intermediate layer. A protective layer and/or a cover is disposed on the ceramic intermediate layer. At least one electrode may be disposed, at least at one connection contact, alongside the resistor structure on the substrate. The invention also relates an exhaust-gas system (Continued)

for controlling and/or regulating an engine, particularly a motor vehicle engine, containing these temperature sensors.

20 Claims, 1 Drawing Sheet

(51) Int. Cl.
    *G01K 1/08* (2006.01)
    *F02D 41/14* (2006.01)
    *G01K 13/02* (2006.01)

(52) U.S. Cl.
    CPC ... *G01K 2013/024* (2013.01); *G01K 2205/04* (2013.01)

(56) References Cited

U.S. PATENT DOCUMENTS

| | | |
|---|---|---|
| 2007/0264529 A1 | 11/2007 | Wahl et al. |
| 2009/0115567 A1 | 5/2009 | Wienand et al. |
| 2010/0117784 A1 | 5/2010 | Holoubek |
| 2011/0305259 A1* | 12/2011 | Wienand ............... G01K 7/183 374/185 |
| 2012/0073970 A1* | 3/2012 | Wang ................. G01N 27/333 204/416 |
| 2014/0153613 A1 | 6/2014 | Wienand et al. |

FOREIGN PATENT DOCUMENTS

| | | |
|---|---|---|
| DE | 10359569 A1 | 7/2005 |
| DE | 10 2007 023 434 A1 | 11/2008 |
| DE | 102007046900 A1 | 4/2009 |
| DE | 10 2009 007 940 B4 | 9/2010 |
| DE | 102009007940 A1 | 9/2010 |
| DE | 10 2011 051 845 B3 | 10/2012 |
| EP | 0115148 B1 | 8/1984 |
| JP | S57-114830 A | 7/1982 |
| JP | 2001269331 A | 10/2001 |

OTHER PUBLICATIONS

International Preliminary Report on Patentability dated May 7, 2015 in International Application No. PCT/EP2013/069696.

Int'l Search Report dated Aug. 26, 2014 in Int'l Application No. PCT/EP2013/069696; Written Opinion (English translation of Search Report only).

* cited by examiner

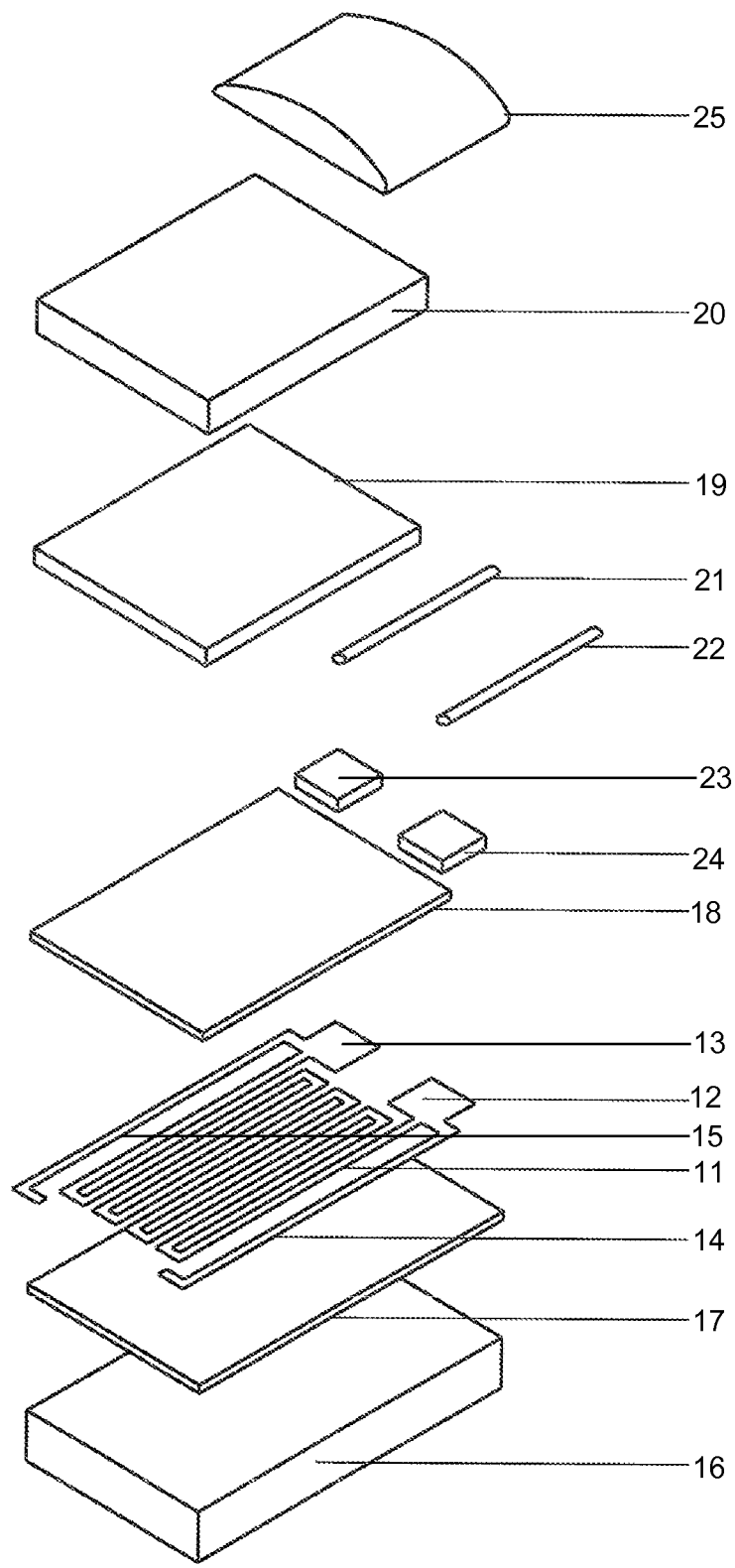

HIGH-TEMPERATURE CHIP WITH HIGH STABILITY

CROSS-REFERENCE TO RELATED APPLICATIONS

This application is a Section 371 of International Application No. PCT/EP2013/069696, filed Sep. 23, 2013, which was published in the German language on May 1, 2014, under International Publication No. 2014/063877 A2 and the disclosure of which is incorporated herein by reference.

BACKGROUND OF THE INVENTION

The invention relates to a temperature sensor, in particular a high-temperature sensor, having a substrate, at least one resistor structure and at least two connection contacts, wherein the connection contacts electrically contact the resistor structure.

Such temperature sensors are used in the automotive industry to measure the exhaust-gas temperature and/or the combustion temperature of engine gases. Temperature measurement should be carried out as close to the engine as possible. For this reason, these sensors must withstand the high temperatures of the combustion gases. Temperature sensors having a flat resistor structure are known from DE 197 42 696 A1, for example.

A few proposals for the design of such temperature sensors that are stable at high temperatures were made in the prior art. For example, a sensor having a self-supporting cover as protection for a platinum resistor structure was proposed in DE 10 2007 046 900 B4. Document DE 10 2009 007 940 B4 makes known a further high-temperature sensor, in which the substrate contains zirconium oxide. In order to prevent poisoning with ions, which are detrimental to the platinum-layer resistor structure, it is proposed in document DE 10 2011 051 845 B4 to additionally apply sacrificial electrodes onto the substrate.

The aforementioned measures are suitable for the development of a temperature sensor that operates at high temperatures. Due to the use thereof at high temperatures, however, very high temperature gradients often occur during the cooling, in particular, of the temperature sensors. At the same time, increasingly faster reaction times of the temperature sensors are required for engine control and engine regulation. In addition, the temperature sensors should also withstand very high temperatures of up to 1,100° C. without resulting in the destruction or drift of the temperature sensor. Therefore, there is still a need in the art for a temperature sensor which operates reliably at these high temperatures and in the presence of frequently occurring changes in temperature without the measurement of the temperature sensor shifting too extremely and too rapidly over time.

The problem addressed by the invention is therefore that of overcoming the disadvantages of the prior art. In particular, a temperature sensor should operate reliably and for a long period of time at high temperatures, even in the presence of rapid changes in temperature. To this end, the drift of the sensor that occurs during measurement should be held to a minimum.

BRIEF SUMMARY OF THE INVENTION

The problems addressed by the invention are solved by a temperature sensor, in particular a high-temperature sensor, having a coated substrate, at least one resistor structure and at least two connection contacts, in which the connection contacts electrically contact the resistor structure. The substrate is made of zirconium oxide or a zirconium oxide ceramic which is stabilized with oxides of a trivalent metal and a pentavalent metal. The substrate is coated with an insulation layer and the resistor structure and the free regions of the insulation layer, on which no resistor structure is disposed, are coated, at least in certain regions, with a ceramic intermediate layer. A protective layer and/or a cover is disposed on the ceramic intermediate layer.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 shows a schematic exploded view of a temperature sensor according to the invention.

DETAILED DESCRIPTION OF THE INVENTION

A temperature sensor, in particular a high-temperature sensor, according to the invention has a coated substrate, at least one resistor structure and at least two connection contacts, in which the connection contacts electrically contact the resistor structure. The substrate is made of zirconium oxide or a zirconium oxide ceramic which is stabilized with oxides of a trivalent metal and a pentavalent metal. The substrate is coated with an insulation layer, and the resistor structure and the free regions of the insulation layer, on which no resistor structure is disposed, are at least partially coated with a ceramic intermediate layer. A protective layer and/or a cover is disposed on the ceramic intermediate layer.

The stabilization of the zirconium oxide or the zirconium oxide in the zirconium oxide ceramic is understood to be a structural stabilization in which a certain crystalline structure is stabilized. Stabilizing the crystalline structure with trivalent and pentavalent metal oxides makes it possible to adapt the thermal expansion of the substrate to the thermal expansion of the intermediate layer and the noble metals of the resistor structure. As a result, thermally induced stress in the resistor structure can be prevented or reduced.

In this connection, it is within the scope of the invention that the resistor structure is completely coated with the ceramic intermediate layer. Preferably, at least the regions of the insulation layer adjacent to the resistor structure are covered. Particularly effective protection of the resistor structure can thus be achieved.

It is also within the scope of the invention for the resistor structure to comprise meanders, wherein the ceramic intermediate layer covers the free regions of the insulation layer between the meanders.

As a result, the resistor layer can be anchored in the insulation layer and the intermediate layer in a particularly fixed manner, thereby holding the entire sensor stable even at high temperatures and rapid changes in temperature.

According to the invention, the zirconium oxide or the zirconium oxide in the zirconium oxide ceramic is preferably stabilized with oxides of a trivalent metal and a pentavalent metal, preferably with 5 to 20 mol % of the oxides. Yttrium oxide is used particularly preferably as an oxide of a trivalent metal. Tantalum oxide and/or niobium oxide are used particularly preferably as oxides of a pentavalent metal. Suitable mixtures are known from EP 0 115 148 B1, for example.

According to the invention, it is preferred if at least one electrode is disposed, at one or both connection contacts, alongside the resistor structure on the insulation layer. More preferably, an electrode is disposed at each of the connection contacts alongside the resistor structure on the insulation layer. The electrode(s) are formed integrally with the resistor structure. Such sacrificial electrodes increase the service life of the temperature sensor by capturing ions that are detrimental to the resistor structure.

Particularly preferably, the insulation layer is a metal oxide layer, preferably an aluminum oxide layer. A mixture of various metal oxides can also be used for the metal oxide layer. The coating of the substrate with metal oxide can be embodied as a metal oxide ceramic.

According to a second embodiment, the problems addressed by the invention are also solved by a temperature sensor, in particular a high-temperature sensor, having a substrate, at least one resistor structure and at least two connection contacts. The connection contacts electrically contact the resistor structure and at least one electrode is disposed, at least at one connection contact, alongside the resistor structure on the substrate. The electrode(s) are formed integrally with the resistor structure, and the resistor structure and the free regions of the substrate, on which the resistor structure is not disposed, are at least partially coated (at least in certain regions) with a ceramic intermediate layer, and a protective layer and/or a cover is disposed on the ceramic intermediate layer.

The combination of the sacrificial electrodes with the intermediate layer yields a temperature sensor that is particularly robust and resistant to detrimental chemical influences. The sacrificial electrodes permit operation to be carried out at high temperatures and the intermediate layer additionally makes it possible for the temperature sensor to withstand the rapid change in temperature.

In the temperature sensors according to embodiments of the invention, the electrode(s) frame the resistor structure at least in certain regions. In particular, at least one side is framed by an electrode, preferably at least two sides of the resistor structure are framed by at least two electrodes, more preferably two opposing sides of the resistor structure are framed by two electrodes. A particularly good protective effect is attained as a result.

Temperature sensors according to the invention can also be characterized in that the ceramic intermediate layer is porous. Preferably, the ceramic intermediate layer has a porosity of 1% to 20%, more preferably a porosity of 5% to 15%, particularly preferably a porosity of 10%.

Due to such porosity, the thermal expansion of the intermediate layer is adapted to the thermal expansion of the substrate or of the insulation layer of the substrate, i.e., of the stabilized zirconium oxide or of the zirconium oxide ceramic, or of the metal oxide of the insulation layer.

According to an embodiment of the invention, the ceramic intermediate layer has a thickness between 1 μm and 50 μm; preferably the ceramic intermediate layer has a thickness between 4 μm and 10 μm. These thicknesses are sufficient for disposing a cover layer and, optionally, a cover on the intermediate layer without causing the intermediate layer, the cover layer, or the cover to crack off due to the different thermal expansion.

The protective layer may be made of glass and/or the cover may be a ceramic chip. In this connection, the glass can also be used, in particular, to fasten the cover.

Preferably, the resistor structure is made of platinum or a platinum alloy, in particular a platinum-base alloy. Platinum or platinum alloys are particularly well suited for the production of high-temperature sensors.

Finally, the problems addressed by the invention are also solved by the use of a temperature sensor according to the invention in an exhaust-gas system for controlling and/or regulating an engine, particularly a motor vehicle engine.

The invention is based on the surprising finding that coating the substrate and the resistor meander with an intermediate layer makes it possible to hold the resistor meander stable, even at high temperatures and in the presence of strong changes in temperature. A particularly stable temperature sensor can be produced when a porous intermediate layer is used, in particular.

As shown in FIG. 1, a meandering, lamellar resistor structure 11 is electrically connected to two connection contacts 12, 13. The resistor structure 11 is framed by two electrodes 14, 15 on approximately more than two sides. The temperature sensor shown in FIG. 1 therefore comprises two electrodes 14, 15, each of which is connected to one of the connection contacts 12, 13, respectively.

The electrodes 14, 15 are connected to the two connection contacts 12, 13 and are used as sacrificial electrodes to protect the resistor structure 11. One of the electrodes 14, 15 shown in FIG. 1, after having been electrically connected to the cathode, will protect the resistor structure 11 being provided as a temperature measuring resistor against penetrating electrochemical contaminants. This simplifies the installation of the temperature sensor, since this temperature sensor cannot be connected incorrectly (i.e., with reversed polarity). The drift of the measuring resistor is therefore drastically reduced independently of the electrical connections. A particularly advantageous aspect of this embodiment is that the housing can also have any polarity and potential.

A substrate 16, which is made of a stabilized zirconium oxide or a zirconium oxide ceramic made of a stabilized zirconium oxide, is coated with an insulating layer 17 made of aluminum oxide, thus ensuring that the resistor structure 11 is not short-circuited by the zirconium oxide, which becomes conductive at high temperatures, and that a detrimental interaction between the zirconium oxide and the platinum meander 11 is prevented. The resistor structure 11, the connection contacts 12, 13, and the electrodes 14, 15 are applied, as a one-piece structure, onto the $Al_2O_3$ coating 17 of the $ZrO_2$ substrate 16. The resistor structure 11 is produced in one working step, for example by means of a photolithographic process. The entire structure can therefore be disposed, for example as a thin film, on a flat surface of the $Al_2O_3$ coating 17 of the stabilized zirconium oxide or the zirconium oxide ceramic made of stabilized zirconium oxide 16. The connection contacts 12, 13 are made of the same material as the resistor structure 11 and the electrodes 14, 15. Platinum or a platinum alloy is preferably used as the material.

On the side facing away from the substrate 16, the resistor structure 11 is provided with a diffusion barrier layer as an intermediate layer 18, which is covered with a passivation coating 19 made of glass or glass ceramic, and with a cover 20.

The cover 20 effectively protects the sensitive structure of the platinum-containing resistor structure 11 against atmospheric poisonings from the surroundings. Given a high level of purity of the ceramic and glass components of the glass ceramic 19, the cations that are particularly detrimental to the resistor structure 11 made of platinum are prevented in such a multi-layer design. These cations would very rapidly contaminate platinum at high temperatures by migrating in the electric field and would therefore influence the temperature/resistance function of the resultant platinum alloy in a drastically negative manner, such that the high-temperature resistance of the resistor structure 11 for temperature measurements would no longer be present. Due to the first thermodynamically stable and pure hafnium or aluminum oxide layer as the intermediate layer 18 or the diffusion barrier, the admission of silicon and other substances or ions that are poisonous to platinum are decisively minimized. The resistor structure 11, which has a meandering shape, for example, is therefore protected against poisoning not only from the substrate side, but also from the opposite side. The intermediate layer 18 or diffusion barrier can be applied by physical vapor deposition.

Preferably, the intermediate layer 18 is applied as a ceramic layer hyperstoichiometrically in such a manner that a highly stable layer of pure aluminum oxide ($Al_2O_3$) covers the platinum structure of the resistor layer 11. The silicon-containing passivation layer 19 made of glass ceramic therefore has only minimal contact with the active platinum resistor structure 11 and, therefore, a sealing of the resistor structure 11 as mechanical protection against external contaminating elements is ensured.

The intermediate layer 18 is applied such that low porosity of approximately 10% is present in the intermediate layer 18. By means of a suitable porosity of the intermediate layer 17, the thermal expansion of the intermediate layer 18 is adapted to the thermal expansion of the $ZrO_2$ coating 17. As a result, the resistor meander 11 is embedded in the $ZrO_2$ coating 17 and the intermediate layer 18. According to the invention, it has been found that a particularly temperature-stable temperature sensor can be constructed in this manner. This temperature sensor is also capable of withstanding several changes in temperature, which are also rapid, in particular, at a high temperature. While conventional temperature sensors of this type can only withstand approximately 500 rapid changes in temperature at 1,000° C. or even slightly above this temperature, it is possible with the design according to the invention to measure approximately 5,000 rapid changes in temperature at these temperatures without resulting in a drift that is too extreme or in the destruction of the temperature sensor.

As shown in FIG. 1, a ceramic chip 20 is applied onto the glass ceramic 19. The ceramic chip 20 is an additional passivation and functions as a mechanical "protective shield" against abrasion by particles in the housing in which the actual temperature sensor is joined. This provides protection against mechanical abrasion and electrochemical contaminations. However, according to the invention, the ceramic chip 20 can also be omitted.

In an embodiment shown in FIG. 1, the connection contacts 12, 13 of the temperature sensor having lead wires 21 and 22 over connection pads 23 and 24 are strain-relieved by means of an electrically insulating fixation drop 25. This fixation 25 is made of highly pure glass or glass ceramic.

The intermediate layer 18 as a diffusion barrier may be applied either by a thin-film method and have a thickness in the range of 0.2 to 10 µm, preferably 5 µm, or by a thick-film method and have a thickness in the range of 5 to 50 µm, preferably 15 µm.

The thickness of the connection contact pads 23, 24 on the resistor structure 11 is in the range of 10 to 50 µm, preferably 20 µm. The substrate 16, as the carrier, has a thickness in the range of 0.1 mm to 1 mm, preferably 0.4 mm, particularly preferably 0.38 mm.

The connection contacts 12, 13 are both disposed on one side. It is also possible, however, to use embodiments of a temperature-resistant resistor or temperature sensor, preferably a high-temperature sensor according to the invention in which the two connection contacts 12, 13 are disposed on opposite sides.

As shown in FIG. 1, after the $Al_2O_3$ layer is applied as the intermediate layer 18, the glass ceramic 19 is applied, connection pads 22, 23 are applied as thick layers, and finally the ceramic cover 20 is applied. Next, the lead wires 21, 22 are connected and a fixation 25 is applied in order to relieve the strain on the lead wires 21, 22.

The features of the invention disclosed in the aforementioned description, and in the claims, figures, and exemplary embodiments can be essential, individually or in any combination thereof, to the realization of the invention in the various embodiments thereof.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A temperature sensor comprising a coated substrate, at least one resistor structure, and at least two connection contacts, wherein the connection contacts directly electrically contact the resistor structure, the substrate comprises zirconium oxide or a zirconium oxide ceramic stabilized with oxides of a trivalent metal and a pentavalent metal, the substrate is coated with an insulation layer, and the resistor structure and free regions of the insulation layer on which no resistor structure is disposed are at least partially coated with a ceramic intermediate layer, and wherein at least one of a protective layer and a cover is disposed on the ceramic intermediate layer, wherein at least one electrode frames at least one side of the resistor structure.

2. The temperature sensor according to claim 1, wherein the resistor structure is completely coated with the ceramic intermediate layer and at least the regions of the insulation layer adjacent to the resistor structure are covered with the ceramic intermediate layer.

3. The temperature sensor according to claim 1, wherein the resistor structure comprises meanders, and wherein the ceramic intermediate layer covers the free regions of the insulation layer between the meanders.

4. The temperature sensor according to claim 1, wherein the zirconium oxide or the zirconium oxide in the zirconium oxide ceramic is stabilized with 5 to 20 mol % of oxides of the trivalent metal and the pentavalent metal.

5. The temperature sensor according to claim 1, wherein the at least one electrode is disposed at least at one connection contact alongside the resistor structure on the insulation layer, and wherein the at least one electrode is formed integrally with the resistor structure.

6. The temperature sensor according to claim 1, wherein the insulation layer is a metal oxide layer.

7. The temperature sensor according to claim 1, wherein the at least one electrode is disposed at least at one connection contact alongside the resistor structure on the substrate, wherein the at least one electrode is formed integrally with the resistor structure.

8. The temperature sensor according to claim 1, wherein at least two sides of the resistor structure are framed by at least two electrodes or at least two opposing sides of the resistor structure are framed by two electrodes.

9. The temperature sensor according to claim 1, wherein the ceramic intermediate layer has a porosity of 1% to 20%.

10. The temperature sensor according to claim 1, wherein the ceramic intermediate layer has a thickness between 1 μm and 50 μm.

11. The temperature sensor according to claim 1, wherein the protective layer comprises glass and/or the cover is a ceramic chip.

12. The temperature sensor according to claim 1, wherein the resistor structure comprises platinum or a platinum alloy.

13. An exhaust-gas system for controlling and/or regulating an engine comprising the temperature sensor according to claim 1.

14. A temperature sensor having a substrate, at least one resistor structure, and at least two connection contacts, wherein the connection contacts directly electrically contact the resistor structure and at least one electrode is disposed at least at one connection contact alongside the resistor structure on the substrate, wherein the at least one electrode is formed integrally with the resistor structure, and the resistor structure and free regions of the substrate, on which the resistor structure is not disposed, are at least partially coated with a ceramic intermediate layer, and wherein at least one of a protective layer and a cover is disposed on the ceramic intermediate layer, wherein the at least one electrode frames the resistor structure at least in certain regions.

15. The temperature sensor according to claim 14, wherein at least two sides of the resistor structure are framed by at least two electrodes or at least two opposing sides of the resistor structure are framed by two electrodes.

16. The temperature sensor according to claim 14, wherein the ceramic intermediate layer has a porosity of 1% to 20%.

17. The temperature sensor according to claim 14, wherein the ceramic intermediate layer has a thickness between 1 μm and 50 μm.

18. The temperature sensor according to claim 14, wherein the protective layer comprises glass and/or the cover is a ceramic chip.

19. The temperature sensor according to claim 14, wherein the resistor structure comprises platinum or a platinum alloy.

20. An exhaust-gas system for controlling and/or regulating an engine comprising the temperature sensor according to claim 14.

* * * * *